United States Patent [19]
Zappia

[11] 3,994,387
[45] Nov. 30, 1976

[54] TWIN DRIVE PUSH BAR STACKER

[75] Inventor: Anthony T. Zappia, Indianapolis, Ind.

[73] Assignee: Ball Brothers Service Corporation, Muncie, Ind.

[22] Filed: Apr. 1, 1975

[21] Appl. No.: 564,102

[52] U.S. Cl. ............................... 198/430; 198/740
[51] Int. Cl.[2] .......................................... B65G 47/32
[58] Field of Search ................. 198/24, 31 AB, 221, 198/222, 224, 31 AA, 31 R; 214/1 BB, 1 BD; 74/37

[56] References Cited
UNITED STATES PATENTS

| | | | |
|---|---|---|---|
| 1,436,455 | 11/1922 | Mingle | 198/222 X |
| 1,839,375 | 1/1932 | Covey | 198/24 |
| 2,547,791 | 4/1951 | Smith et al. | 198/31 AA |
| 2,808,921 | 10/1957 | Knowles | 198/24 X |
| 2,980,038 | 4/1961 | Royer | 198/24 X |
| 3,040,867 | 6/1962 | Posten et al. | 198/31 AA |
| 3,184,031 | 5/1965 | Dunlap | 198/24 |
| 3,200,967 | 8/1965 | Delzanno | 198/24 X |
| 3,202,262 | 8/1965 | Jones, Jr. | 198/24 |
| 3,333,674 | 8/1967 | Homan | 198/24 |
| 3,853,213 | 12/1974 | Lehman et al. | 198/24 X |

FOREIGN PATENTS OR APPLICATIONS 1,370,729   7/1964   France ............................... 198/221

Primary Examiner—Johnny D. Cherry
Assistant Examiner—Richard K. Thomson
Attorney, Agent, or Firm—Jenkins, Hanley & Coffey

[57] ABSTRACT

A lehr loader for use with a conveyor for moving ware serially past the moving apron of a lehr, the loader comprising a frame adapted to be adjacent the conveyor, and a pusher bar mounted on the frame to be alongside the conveyor and opposite the lehr apron, the bar being movable transversely across the conveyor to sweep ranks of ware transversely from the conveyor onto the lehr apron for movement thereon through the lehr. The improvement comprises the mechanism by which the bar is mounted for such movement and the drive mechanism for the bar, the mounting mechanism including a pair of arm structures supporting the bar at longitudinally spaced apart points along its length, a pair of carriages, and guides supporting each carriage for reciprocation in the direction of such sweeping movement of the bar. Each arm structure is mounted upon its carriage for movement upwardly and downwardly. The drive mechanism includes a mechanism for reciprocating the carriages and raising and lowering the arm structures thereon.

9 Claims, 5 Drawing Figures

TWIN DRIVE PUSH BAR STACKER

The present invention relates to lehr loaders or stackers, and more particularly to the provision of a loader having a pusher bar supported for the required movement by a novel support structure and driven by a novel driving structure.

The invention has been devised primarily for driving a pusher bar in a lehr loader in which the pusher bar must travel at a relatively low level to push ware from an incoming conveyor onto a belt or apron travelling transversely with respect to the incoming conveyor, must then be raised to a level above the top of the ware moving on the incoming conveyor and, at an upper level, must be retracted and then must be lowered to its starting point; and therefore the invention has been illustrated and will be described in what is presently believed to be the optimum form for use in that environment. However, it will be understood that the invention must have uses in other environments.

The prior art discloses a multitude of different types of lehr loaders. My own U.S. Pat. No. 3,244,266 discloses a lehr loader having a pusher bar movably supported by a chain-drive mechanism.

I believe my present invention, and particularly the push bar mounting and drive arrangement of my present invention constitutes a significant and novel improvement over the prior art.

In the present invention, a pair of race-track chain drive mechanisms provide the basic stacker motion with a high degree of accuracy and reliability. Each chain drive mechanism reciprocates a carriage on which an arm means is mounted and raises and lowers the arm means on the carriage. The two arm means support the pusher bar at longitudinally spaced apart points therealong. Cam means is provided for shifting the arm means and the bar held thereby laterally to track the ware as it moves on the cross conveyor to eliminate interference with the next ware in the following row.

It is an object of the present invention, therefore, to provide a lehr loader for use with a conveyor for moving ware serially past the moving apron of a lehr, the loader comprising frame means adapted to be adjacent the conveyor, a pusher bar alongside the conveyor and opposite the lehr apron, the bar being movable transversely across the conveyor to sweep ranks of ware transversely from the conveyor onto the lehr apron for movement thereon through the lehr. The improvement comprises means for mounting the bar upon the frame means for such movement and drive means for moving the bar, the mounting means including a pair of arm means supporting the bar at longitudinally spaced apart points along its length, a pair of carriages, guide means supporting each carriage for reciprocation in the direction of such sweeping movement of the bar, and means for mounting each arm means upon one of the carriages for movement upwardly and downwardly thereon. The drive means include means for reciprocating the carriages and raising and lowering the arm means thereon.

Another object of the present invention is to provide such a drive means including, for each carriage, a pair of rotor means journal mounted for rotation about horizontally extending axes parallel to the bar and spaced apart in the direction of the said sweeping movement of the bar, flexible means trained about the rotor means, and means for providing a driving connection between the flexible means and the carriage and between the flexible means and the arm means mounted thereon.

Another object of the present invention is to provide such a drive means including rotor means, and means for providing a driving connection between the rotor means and the carriage to reciprocate the carriage and between the rotor means and the arm means to raise and lower the arm means on the carriage as it reciprocates.

Other objects and features of the present invention will become apparent as this description progresses.

To the accomplishment of the above and related objects, this invention may be embodied in the form illustrated in the accompanying drawings, attention being called to the fact, however, that the drawings are illustrative only, and that change may be made in the specific construction illustrated and described, so long as the scope of the appended claims is not violated.

Figure 1:
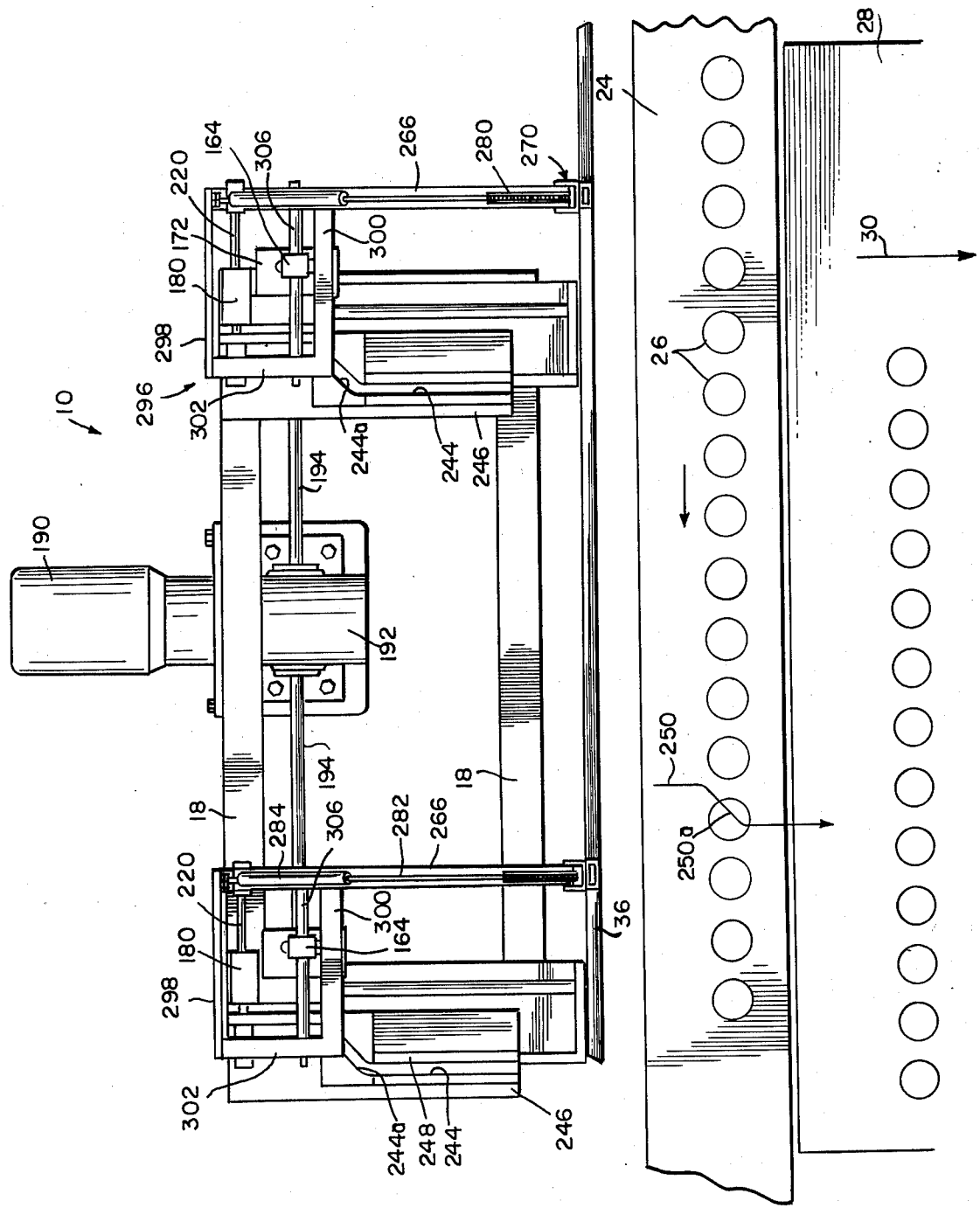
FIG. 1 is a top plan view showing the lehr loader in conjunction with a lehr apron and a feed conveyor.

Referring now particularly to the drawings, the lehr loader 10 is shown comprising a support frame 12 including support legs 14 which may be connected together by lower cross braces 16 and upper cross braces 18 as illustrated to provide a structurally sound framework upon which the components of the lehr loader are mounted. Casters 20 may be provided, respectively, at the lower ends of the legs 14, and adjustable mounts as indicated at 22 may be provided for adjustably positioning the frame 12 adjacent, for instance, the conveyor 24 (FIG. 1) upon which ware items 26 are serially fed to a lehr apron 28 which is continuously moving in the direction of the arrow 30 perpendicular to the direction of movement of the conveyor 24. The pusher bar 36 is mounted upon the lehr loader 10 to be transversely movable across the conveyor 24 to sweep ranks of ware 26 onto the apron 28.

Figure 2:
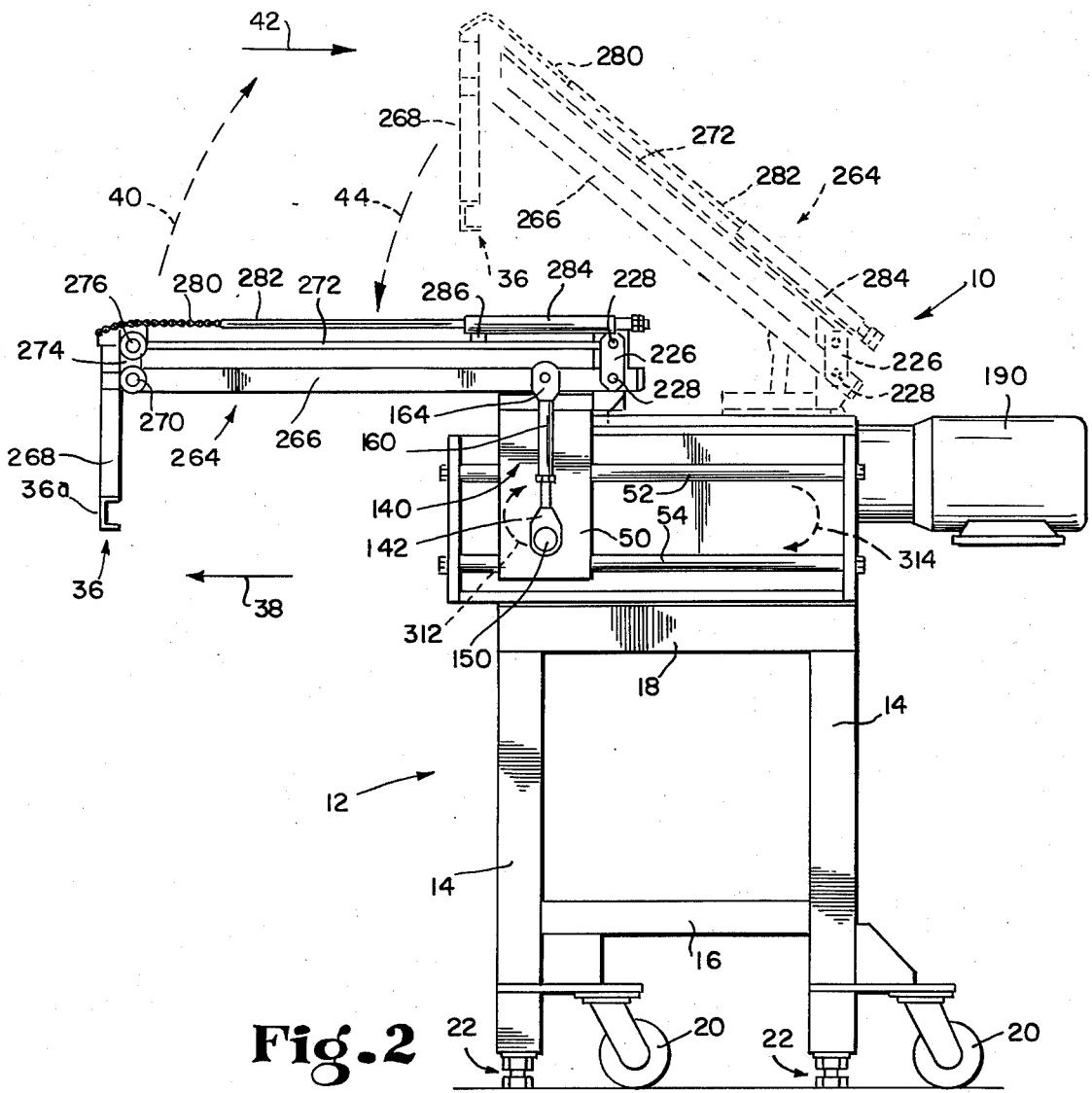
FIG. 2 is a side elevational view of the lehr loader taken from the right-hand side of FIG. 1.

Turning to FIG. 2, arrows 38, 40, 42, 44 indicate the path through which bar 36 moves during operation of the lehr loader 10 including a forward stroke toward the lehr apron as indicated by the arrow 38, an upward stroke as indicated by the arrow 40, a rearward stroke as indicated by the arrow 42, and a downward stroke as indicated by the arrow 44 to the starting position for the forward stroke.

Figure 4:
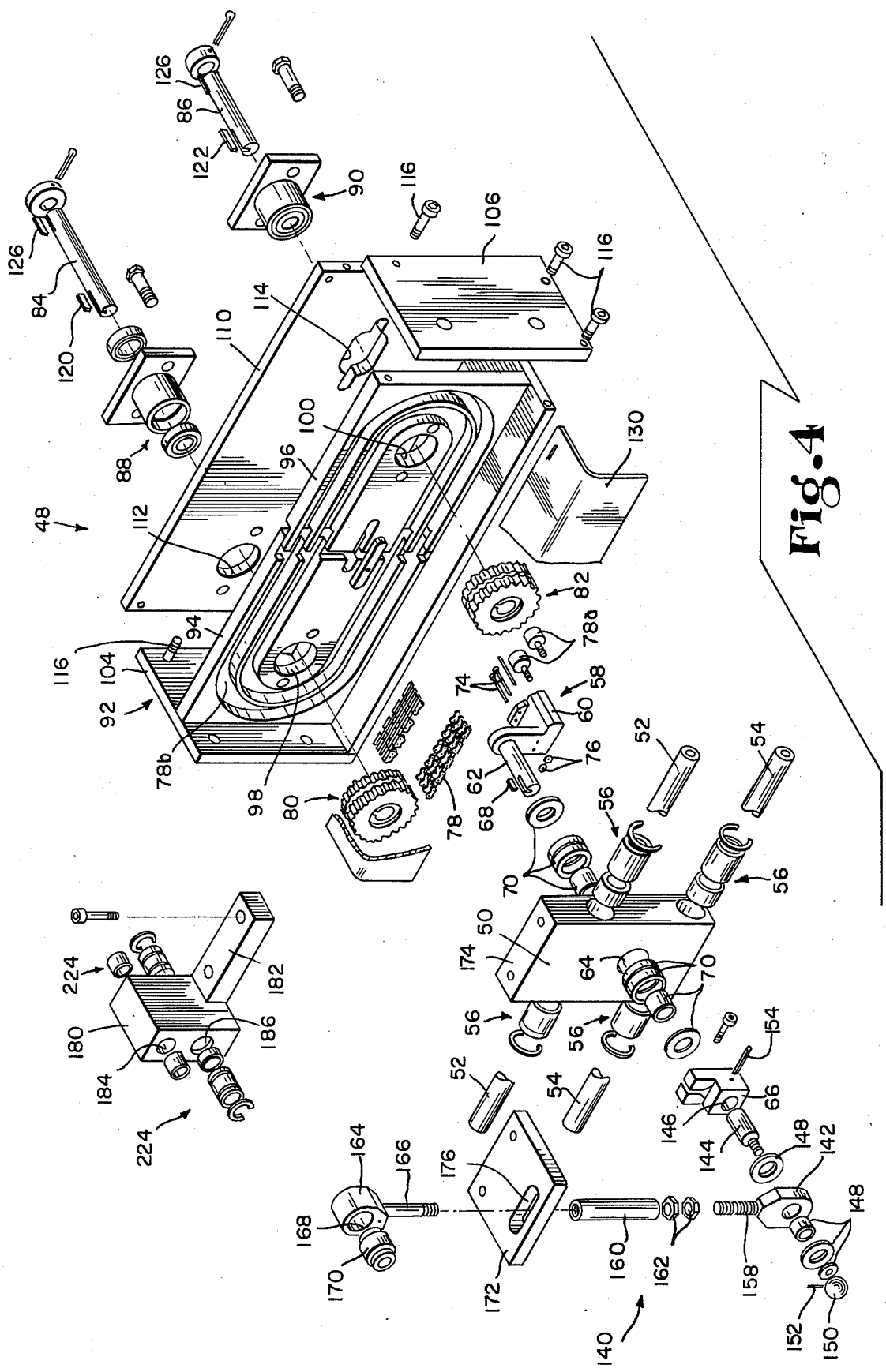
FIG. 4 is an exploded perspective view of the drive mechanism of the present invention.
Figure 5:
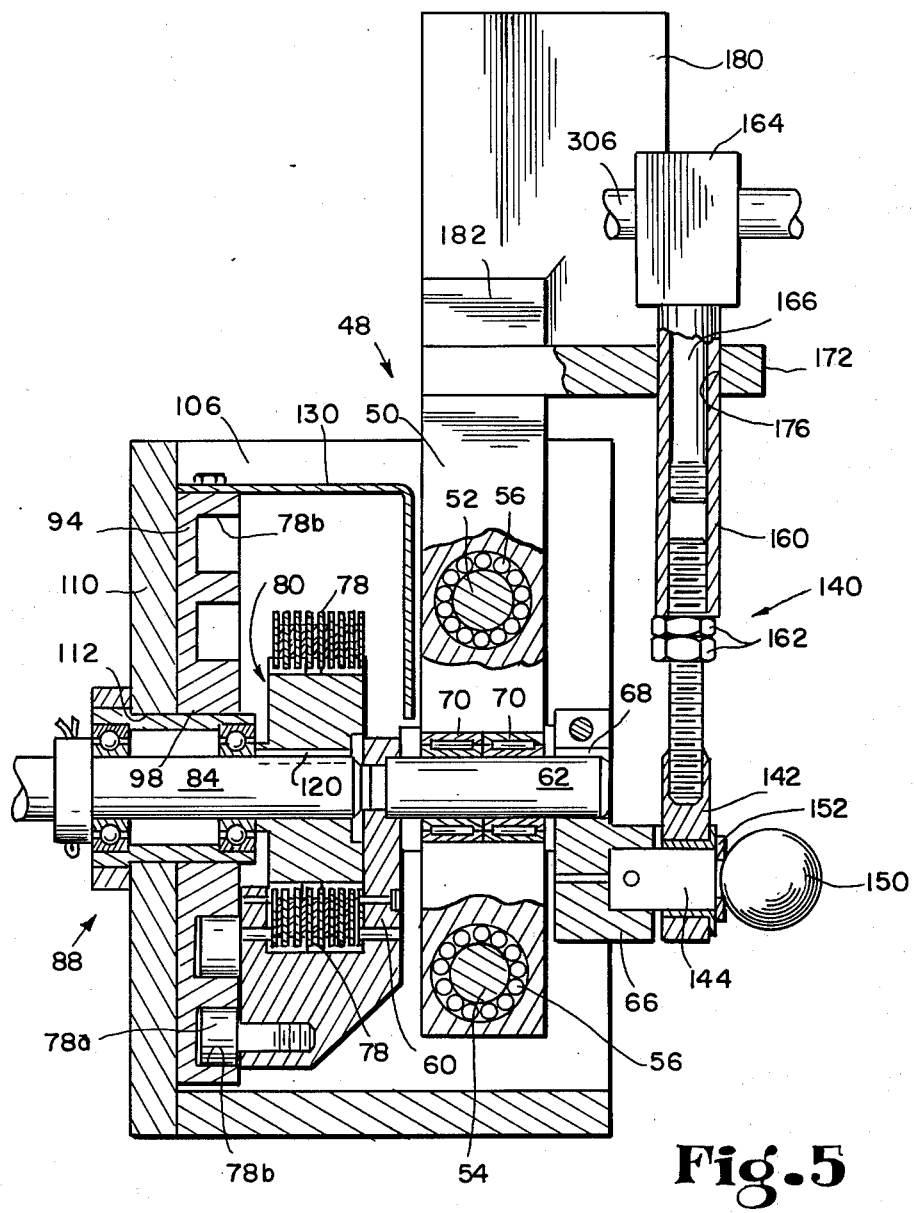
FIG. 5 is an enlarged fragmentary sectional view of the drive mechanism of FIG. 4.

The mounting means and the drive means of the present invention will now be discussed with particular reference to FIGS. 4 and 5 initially, the basic drive assembly being indicated at 48. The mounting means for each end of the bar 36 as well as the drive means for each end of the bar are identical such that a detailed description of only one mounting means and one drive means will suffice. The mounting means includes, for each bar 36 end, a carriage 50 supported for reciprocation in the direction of the forward stroke on guide rods 52, 54 with appropriate bearing means indicated at 56 movably mounting the carriage upon the rods. Crank means 58 including a block 60 from which a shaft 62 extends horizontally in the direction of the pusher bar 36 is provided to extend through an opening 64 in the carriage 50 and to support, on its distal end, a block 66 providing an eccentric for the crank means. Suitable bearing means and washers 70 are provided for mounting the shaft 62 in the carriage 50 opening 64. Fastening elements such as the screws 74 and nuts 76 are provided for fastening the crank block 60 to a chain 78 which is trained about a pair of sprockets 80, 82 journal mounted for rotation about parallel, horizontally extending axes spaced apart in the direction of the said forward stroke (arrow 38). A pair of bearings 78a are mounted upon the block 60 to ride in a trackway 78b about the perimeter of the path of the chain 78. The sprockets 80, 82 are mounted, respectively, on sprocket shafts 84, 86 journal mounted by means of bearing blocks 88, 90, upon the drive assembly housing 92. That housing 92 includes adjustably movable wall sections 94, 96 having openings 98, 100, respectively, therein through which the shafts 84, 86 and their bearings extend. The two wall sections 94, 96, which define the track 78b, are adjustable for purposes of adjusting the tension on the chain 78. The drive assembly housing 92 also includes end plates 104, 106, a side plate 110 also with openings 112, 114 for the shafts 84, 86 and their bearing blocks 88, 90 with sundry fastening elements 116 for holding the parts of the housing together. The opening 114 is elongated in the direction of adjustment of the wall sections 94, 96.

The sprockets 80, 82 are drivingly connected to the shafts 84, 86 by keys 120, 122, respectively. The shafts 84, 86 have illustratively another key 126 on the opposite end for providing a driving connection between one of the shafts and the power shaft 194 for the two drive assemblies 48 as shown in FIG. 1. Either sprocket 80, 82 may be the input sprocket or driving sprocket for the assembly 48. A cover 130 is mounted upon the housing 92 to cover the sprockets and chain.

A rigid link means 140 is drivingly connected to the eccentric block 66, the illustrative link means including a connector 142 which is mounted upon a shaft 144 received in an opening 146 in the block 66. The opening 146 is eccentrically disposed relative to the opening in the block 66 into which the shaft 62 extends. Rotation of the shaft 62, therefore, swings the shaft 144 in an arc about the axis of the shaft 62. Washers and bearings 148 are conventionally used in the mounting of the connector 142 on the shaft 144, and a knob 150 is mounted on the threaded distal end of the shaft 144 with a pin 152 through the shaft to keep the connector 142 on the shaft. The connector 142 provides a threaded shaft 158 extending vertically upwardly threadedly to engage a sleeve 160. Locking and adjustment nuts 162 may be threaded on the shaft 158 as illustrated. The link means 140 includes an upper connector 164 providing a downwardly extending threaded shaft 166 which threadedly engages the sleeve 160. The connector 164 also provides an opening 168 therethrough which receives a bearing 170 for purposes to be discussed hereinafter. A plate 172 is mounted on the top surface 174 of the carriage 50, the plate providing an opening 176 elongated in the direction of the guide rods 52, 54 and through which the sleeve 160 extends. A block 180 is mounted on top of the plate 172 by means of an extension 182, the block 180 providing openings 184, 186 extending therethrough and parallel to the axes of the sprocket shafts 84, 86. The function of this block 180 will be discussed hereinafter.

The loader 10 comprises, in the illustrative embodiment, a motor 190 and gear box 192 (FIGS. 1 and 2) providing an output shaft 194 which is drivingly connected to the input sprockets of the assemblies 48. The motor 190 is preferably a selectively variable speed motor such that the speed of the output shaft 194 and, consequently, the drive assemblies 48 can be selectively controlled.

Figure 3:
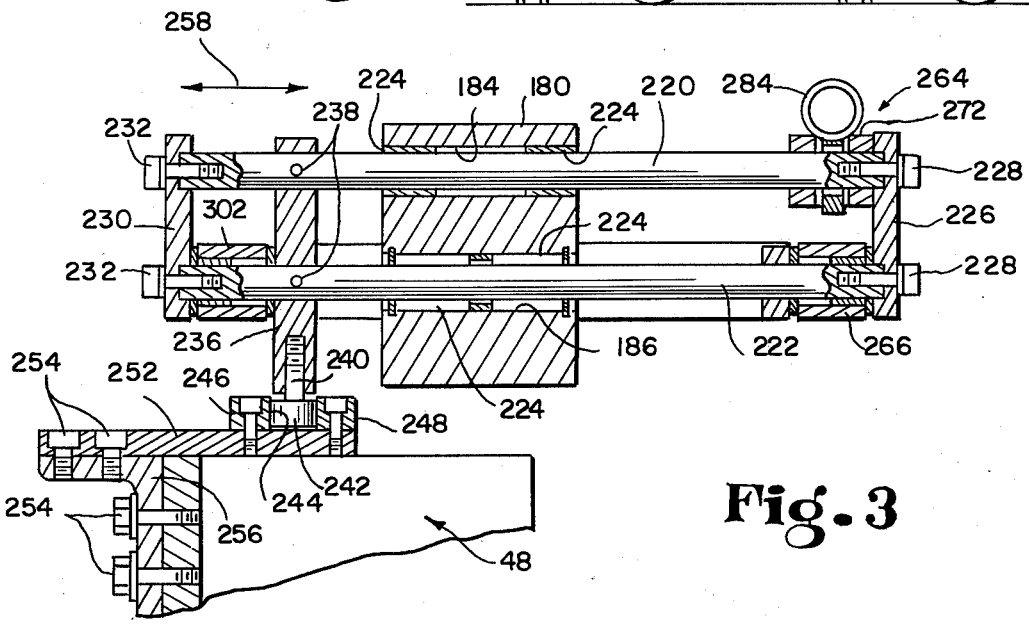
FIG. 3 is a fragmentary sectional view, enlarged, showing the cam means for shifting the push bar as it moves transversely across the feed conveyor.

Referring now specifically to FIG. 3, it will be seen that cylindrical rods 220, 222 extend respectively through the openings 184, 186 in the block 180 on each carriage 50 with bearings 224 supporting the rods 220, 222 for longitudinal reciprocation in the block 180. Rods 220, 222 are horizontal and parallel to the bar 36 and the sprocket shafts 84, 86. An end plate 226 is connected to the right-hand ends (FIG. 3) of the rods 220, 222 by fastening elements 228 while another end plate 230 is connected to the left-hand ends of fastening elements 232. A connector member 236 is fastened to the two rods 220, 222 by means such as the illustrated pins 238 to extend downwardly therefrom. A bolt 240 supports a roller bearing 242 on the lower end of the connector member 236 for rotation about a vertically extending axis, the bearing 242 being received in a cam track 244 which extends in the direction of movement of the bar 36 except for a short segment 244a (FIG. 1) which inclines toward the conveyor 24 and in the direction of the movement of the conveyor. Each cam track 244 is illustratively defined by track members 246, 248 between which the bearing 242 moves. The arrow 250 in FIG. 1 represents the movement of the bar 36 with the short arrow segment 250a representing the movement caused by the cam track section 244a. The members 246, 248 (FIG. 3) may be mounted upon a cam plate 252 which is fastened to the associated drive assembly 48 by means such as the illustrated fastening elements 254 and angle plate 256. The rods 220, 222, therefore, are shiftable on the carriage 50 (block 180) in the direction of the arrow 258 by cam means.

Each carriage 50 carries arm means indicated generally at 264 for movably supporting the bar 36, the illustrative arm means including a first arm 266 mounted on the carriage 50 for pivotal movement at its proximal end about a horizontal axis parallel to the bar 36. Illustratively, the first arm 66 is mounted upon the lower rod 222 for pivotal movement as best seen in FIG. 3. A second arm 268 is mounted upon the distal end of the first arm 266 for pivotal movement about a horizontal axis parallel to the bar 36, the second arm pivot means being indicated at 270. The arm 268 extends vertically downwardly to provide a lower end to which the bar 36 is connected. An arm 272 is parallel with each first arm 266 and pivotally connected to the upper rod 220 for pivotal movement (FIG. 3) with the first arm. A short, vertically extending link 274 has its opposite ends pivotally connected, respectively, to the distal ends of the first arm 266 and the arm 272 by pivot means 270 and another pivot means 276. This link 274 remains vertically extending because the end plates 226, 230 between the guide rods 220, 222 remain vertically extending. The upper end of the second arm 268 is yieldably held against the pivot means 276 by means such as the illustrated chain 280, and rod 282 which extends from a spring tube 284 mounted on the arm 272 by means indicated at 286. This spring arrangement, which is preferably adjustable, provides yieldable means for holding the second arm 268 in its vertically downwardly extending position. If the arm 268 or the bar 36 held thereby encounters a rigid object, the spring within the tube 284 will yield to permit the second arm 268 to pivot counterclockwise about the distal end of the first arm 266.

Further, for strength purposes, the proximal end portion of each first arm 266 may be formed to include a rectangular frame 296 movable with the arm, the frame including a back member 298, front member 300 and side member 302 with the arm 266 forming the other side member. This frame 296, therefore, pivots about the lower rod 222 (FIG. 3) with the arm. Spaced forwardly from the pivot axis of the rod 222 is a cylindrical rod 306 parallel to the pivot axis and rigidly supported by the frame. This rod 306 extends through the upper connector 164 of the associated rigid link 140 and, of course, slides through the bearing 170 in that connector to permit the arm 266 to be shifted by the cam track 244 relative to the carriage 50 upon which the arm is mounted.

With the above description in mind, it will be appreciated that operation of the motor 190 and gear box 192 drives each chain 78 about its sprocket 80, 82. Each drive assembly 48, therefore, reciprocates its associated carriage 50 backward and forward upon its guide rods 52, 54 while, at the same time, raising and lowering the rigid link means 140, the upper end of which is connected to the arm means 264 mounted upon the carriage 50. As the block 66 starts to travel upwardly about the sprocket 80, the connector 142 will be cranked upwardly as indicated by the arrow 312 in FIG. 2 to raise the rigid link means 140. As the block 60 moves about each sprocket 80, 82, the axis of its shaft 62 stays coincident with the rotational axis of the sprocket functioning as a journal axis for the block. The axis of that shaft 62, therefore, moves in a horizontal plane defined by the parallel axes of the sprockets 80, 82. As the block 60 moves rearwardly toward the sprocket 82, on the upper run of the chain 78, the rigid link means 140 is held in its upper position. Then, as the block 60 starts moving downwardly about the sprocket 82, the connector 142 moves downwardly as indicated by the arrow 314 in FIG. 2. Each drive assembly 48, therefore, reciprocates its associated carriage 50 and raises and lowers the arm means 264 and specifically the first arm 266 pivotally mounted on the carriage.

I claim:

1. A stacker-pusher comprising frame means, a pusher bar extending longitudinally and horizontally along said frame means, said bar being movable through a path including a transverse horizontal stroke perpendicular to the direction of extension of said bar, in which the improvement comprises means for mounting the bar for such movement and means for driving said bar, said mounting means including a carriage reciprocably movable in the direction of said transverse horizontal stroke, a first arm mounted on said carriage for pivotal movement at its proximal end about a horizontal axis parallel to said bar, a second arm mounted on the distal end of said first arm for pivotal movement about a horizontal axis parallel to the last said axis, said second arm extending downwardly to provide a lower end to which said bar is attached, and said drive means including a pair of rotor means journal mounted for rotation about horizontally extending axes parallel to said bar and defining a horizontally extending plane therebetween, flexible means trained about said rotor means, means for providing a driving connection between said flexible means and said carriage and between said flexible means and said first arm pivoted on said carriage, said means for providing a driving connection including link means connected to said first arm and crank means for raising and lowering said link means, said crank means being connected to said flexible means to raise and lower said link means as said crank means moves about said rotor means, said crank means including a shaft journaled in said carriage to reciprocate said carriage, and means for eccentrically connecting one end of said link means to said shaft, said shaft having a journal axis remaining in said plane, whereby movement of said flexible means about said rotor means reciprocates said carriage and raises and lowers said first arm.

2. The improvement of claim 1 in which said mounting means includes means for mounting said proximal end of said first arm on said carriage for shifting movement in a direction parallel to said pivot axis at said proximal end of said first arm, and cam means for shifting said first arm and said bar in the direction of extension of said bar as said carriage reciprocates through a portion of its travel.

3. The improvement of claim 1 including means for normally keeping said second arm extending vertically downwardly.

4. The improvement of claim 3 including means for yieldably resisting movement of said second arm from its vertically extending position.

5. The improvement of claim 1 including another arm parallel to said first arm and mounted on said carriage for pivotal movement at its proximal end about a horizontal axis vertically above and parallel to the pivot axis for said first arm, said parallel arm being of the same length as said first arm, a link extending between and connected at its opposite ends respectively to the distal ends of said first arm and said parallel arm, the distance between the axes of the pivotal connections at the opposite ends of said link being equal to the vertical distance between the pivot axes for said first arm and said parallel arm, whereby said link remains vertically extending as said first arm pivots, and means for yieldably holding said second arm parallel to said link, said holding means permitting said second arm to pivot about the distal end of said first arm when said bar encounters an immovable object during said stroke.

6. A stack-pusher comprising frame means, a pusher bar extending longitudinally and horizontally along said frame means, said bar being movable through a path including a transverse horizontal stroke perpendicular to the direction of extension of said bar, in which the improvement comprises means for mounting the bar for such movement and means for driving said bar, said mounting means including a carriage reciprocably movable in the direction of said transverse horizontal stroke, arm means mounted on said carriage for movement upwardly and downwardly, said bar being connected to said arm means, said arm means comprising a first arm mounted on said carriage for pivotal movement at its proximal end about a horizontal axis parallel to said bar, said drive means including rotor means, means for providing a driving connection between said rotor means and said carriage to reciprocate said carriage and between said rotor means and said arm means to raise and lower said arm means on said carriage, said means for providing a driving connection including flexible means trained about said rotor means for movement in response to rotation thereof, link means connected to said first arm and crank means for raising and lowering said link means, said crank means being connected to said flexible means for movement therewith as said flexible means moves about said rotor means, said crank means including a shaft journalled in said carriage to reciprocate said carriage as said crank means moves with said flexible means, and means for eccentrically connecting on end of said link means to said shaft, movement of said shaft and said eccentric means as said crank means moves with said flexible means causing said link means to lift and lower said first arm.

7. The improvement of claim 6 including means for mounting said arm means upon said carriage for shifting movement in a direction parallel to the direction of extension of said bar, and cam means for shifting said arm means and said bar in the direction of extension of said bar as said carriage reciprocates through a portion of its travel.

8. The invention of claim 6 in which said rotor means includes a pair of sprockets mounted for rotation about horizontally extending axes parallel to said bar and perpendicular to the direction of said stroke, and a chain trained about said rotor means.

9. In a lehr loader for use with a covnveyor for moving ware serially past the moving apron of a lehr, said loader comprising frame means adapted to be adjacent said conveyor, a pusher bar alongside the conveyor and opposite the lehr apron, said bar being movable transversely across the conveyor to sweep ranks of ware transversely from the conveyor onto the lehr apron for movement thereon through the lehr, in which the improvement comprises means for mounting said bar upon said frame means for such movement and drive means for moving said bar, said mounting means including a pair of arm means supporting said bar at longitudinally spaced apart points along its length, a pair of carriages, guide means supporting each carriage for reciprocation in the direction of such sweeping movement of said bar, each said arm means comprising a first arm mounted on each said carriage for pivotal movement at its proximal end about a horizontal axis parallel to said bar, said drive means including means for reciprocating said carriages and raising and lowering said first arms thereon, said drive means including a pair of rotor means journalled for rotation about horizontally extending axes parallel to said bar and spaced apart in the direction of said bar movement, flexible means trained about said rotor means, means for providing a driving connection between said flexible means and said arm means, said means for providing a driving connection including link means connected to one of said first arms and crank means for raising and lowering said link means, said crank means being connected to said flexible means for movement therewith as said flexible means moves about said rotor means, said crank means including a shaft for engaging said carriage to reciprocate said carriage as said crank means moves with said flexible means, and means for connecting one end of said link means to said shaft, movement of said shaft and said connecting means as said crank means moves with said flexible means causing said link means to lift and lower said one of said first arms.

* * * * *

PO-1050
(5/69)

UNITED STATES PATENT OFFICE
CERTIFICATE OF CORRECTION

Patent No. 3,994,387            Dated November 30, 1976

Inventor(s)      Anthony T. Zappia

It is certified that error appears in the above-identified patent and that said Letters Patent are hereby corrected as shown below:

Column 1, line 28, after "invention", insert a comma.
    Column 6, line 51 (Claim 6, line 1), change "stack-pusher" to -- stacker-pusher --.
    Column 7, line 12 (Claim 6, line 30), change "on" to -- one --.

Signed and Sealed this

Twenty-second Day of March 1977

[SEAL]

*Attest:*

RUTH C. MASON
*Attesting Officer*

C. MARSHALL DANN
*Commissioner of Patents and Trademarks*